US005665912A

United States Patent [19]
Laughlin

[11] Patent Number: 5,665,912
[45] Date of Patent: Sep. 9, 1997

[54] ACTIVE MAGNETOHYDRODYNAMIC RATE SENSOR

[75] Inventor: Darren R. Laughlin, Albuquerque, N. Mex.

[73] Assignee: A-Tech Corporation, Albuquerque, N. Mex.

[21] Appl. No.: 674,778

[22] Filed: Jul. 3, 1996

[51] Int. Cl.$^6$ ............................................. G01P 9/00
[52] U.S. Cl. ................................................ 73/504.05
[58] Field of Search .......................... 73/504.05, 504.07, 73/504.17, 514.03, 514.08, 514.09

[56] References Cited

U.S. PATENT DOCUMENTS

| | | | |
|---|---|---|---|
| 4,718,276 | 1/1988 | Laughlin | 73/514.03 |
| 5,067,351 | 11/1991 | Laughlin | 73/514.03 |
| 5,176,030 | 1/1993 | Laughlin | 73/504.07 |

*Primary Examiner*—Christine K. Oda
*Attorney, Agent, or Firm*—Pollock, Vande Sande & Priddy

[57] ABSTRACT

A magnetohydrodynamic sensor having an annular or circular sense channel containing a conductive liquid proof mass. A radial flow is introduced into the annular channel which, in response to rotation of the device, produces a coriolis force and resulting circumferential velocity of the fluid. An electromagnetic winding produces an alternating electromagnetic field directed perpendicular to the annular channel. First and second electrodes sense a time varying electric potential induced between the center of the annular channel and the circumference of the annular channel. The time varying electrical potential is proportional to the strength of the time varying electric field and rotational velocity of the channel with respect to said proof mass. The transformer connected to the electrodes provides for amplification of the signal representing the rotational velocity of the channel with respect to the proof mass. Synchronous detection of the alternating voltage produced by the electrodes permits very small angular velocities to be measured.

14 Claims, 7 Drawing Sheets

FIG_1

FIG_2

ACTIVE MAGNETOHYDRODYNAMIC RATE SENSOR

The present invention relates to sensors for measuring angular velocity. Specifically, a magnetohydrodynamic sensor is described which measures a circumferential flow rate which results from a coriolis acceleration of a conductive liquid within a circular or annular channel.

The present invention is an outgrowth of my previous inventions described in U.S. Pat. Nos. 4,718,276, 5,067,351 and 5,176,030. U.S. Pat. No. 5,176,030 describes an active MHD generator which is used to sense angular rates. The principle of operation of the foregoing patented device relies upon a radial flow field in a conductive liquid in a circular channel. When the sensor is subjected to a transient angular rotation about a sensing axis, the conductive liquid within the circular channel acts as a proof mass, remaining stationary with respect to rotation imparted to the sensor containing the conductive liquid. A static magnetic field is applied perpendicular to the conductive liquid channel. A flow is induced in the liquid by pumping the liquid radially across each of two circular sense channels within the device. In a constant input rate condition, coriolis acceleration causes tangential (circumferential) velocity components in the flow fields of the liquid within the sense channels. The MHD effect on these tangential velocity components produces an electrostatic potential between the inner circumference of the conductive fluid and outer circumference of the conductive fluid proportional to the angular input rate of the sensor.

The active sensor of the foregoing patent has demonstrated a resolution and drift rate which is marginal for some applications. In inertial navigation applications, it is desirable to measure angular velocity with a resolution of better than 0.0001°/s., whereas the device of the foregoing patent has a measurement resolution limited to approximately 1°/sec.

The drift rate associated with the prior magnetohydrodynamic sensor is approximately several hundred degrees per hour, whereas in the application of an inertial navigation gyro, drift rates of less than 0.1°/hr. are desirable.

In order to measure the much smaller angular rates, design changes are implemented to the foregoing described device in order to specifically develop a low cost angular rate sensor having the required accuracy for inertial land navigation applications.

SUMMARY OF THE INVENTION

It is an object of this invention to provide for the measurement of angular rates below 1°/sec.

It is another object of this invention to provide an angular rate sensor having a low drift rate.

These and other objects of the invention are provided by a magnetohydrodynamic sensor having an annular or circular channel containing a conductive liquid proof mass which remains substantially stationary as the annular channel rotates about a measurement axis for high frequency (>1 Hz) rate measurements. To allow low frequency (<1 Hz) rate measurements, the channel receives a radial flow of conductive fluid between the circumference of the annular channel and the center of the annular channel. Low frequency (constant to about 1 Hz.) angular rates are detected by measuring the coriolis component of the radial fluid flow in the sense channel. An alternating electromagnetic field is established perpendicular to the plane of the annular channel, and an alternating electrical potential is induced radially within the annular channel due to the motion of the conductive proof mass within the electromagnetic field which is perpendicular to the annular channel. The voltage across the annular channel is sensed by first and second electrodes on the inner circumference and outer circumference of the annular channel, respectively, and amplified by a transformer having a primary winding connected across the electrodes. The amplified signal produced in a secondary winding of the transformer is proportional to the angular rate imparted to the sensor modulated by the magnetic flux density through the sense channel.

The angular rate signal produced from the sensor is synchronously detected with respect to the applied electromagnetic field, providing a substantially increased measurement resolution (and improved noise rejection) over the prior sensor design.

In a preferred embodiment of the invention, the magnetohydrodynamic rate sensor includes two channels, one sense channel and one flow straightener channel, disposed in parallel with each other, carrying a conductive fluid proof mass. The two channels are connected together by a central channel connecting the two annular channels along the inner circumference, and by a return channel connecting the outer circumference of each of the annular channels. A magnetohydrodynamic pump within the central channel provides a fluid flow between annular channels, creating a radial flow across each of the channels. The flow is set to be radially outward in the sense channel such that the passive and active mode gains can be matched and the phase response remains near zero degrees.

Once a rotational velocity has been imparted to the housing supporting the annular channels, the relative motion between the housing and the conductive fluid proof masses imparts a coriolis acceleration to the radially flowing liquid entering and leaving the annular channels producing a circumferential flow rate within the annular channels. The circumferential flow rate of the liquid proof mass within the channel is proportional to the radial flow rate, the applied magnetic flux density, and the input angular rate, and produces a time varying electrical potential induced between the inner and outer circumference of the sense channel. The voltage is amplified by a transformer before being synchronously detected.

DESCRIPTION OF THE PREFERRED EMBODIMENT

Figure 1:
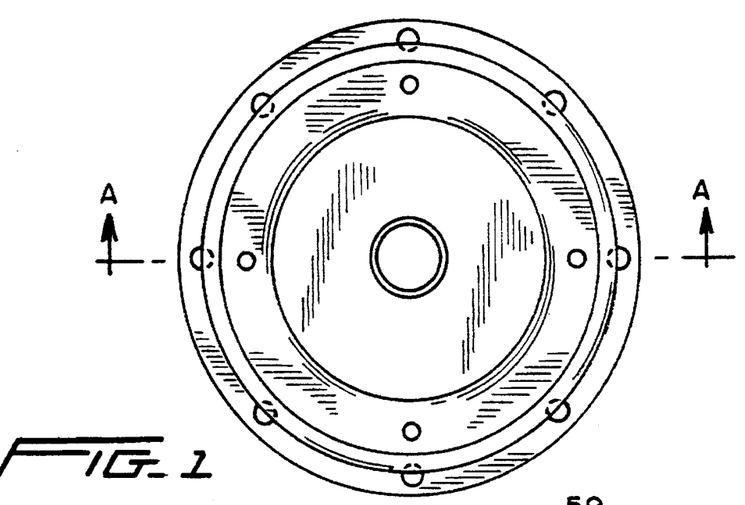
FIG. 1 is a top view of a sensor assembly in accordance with a preferred embodiment of the invention.
Figure 2:
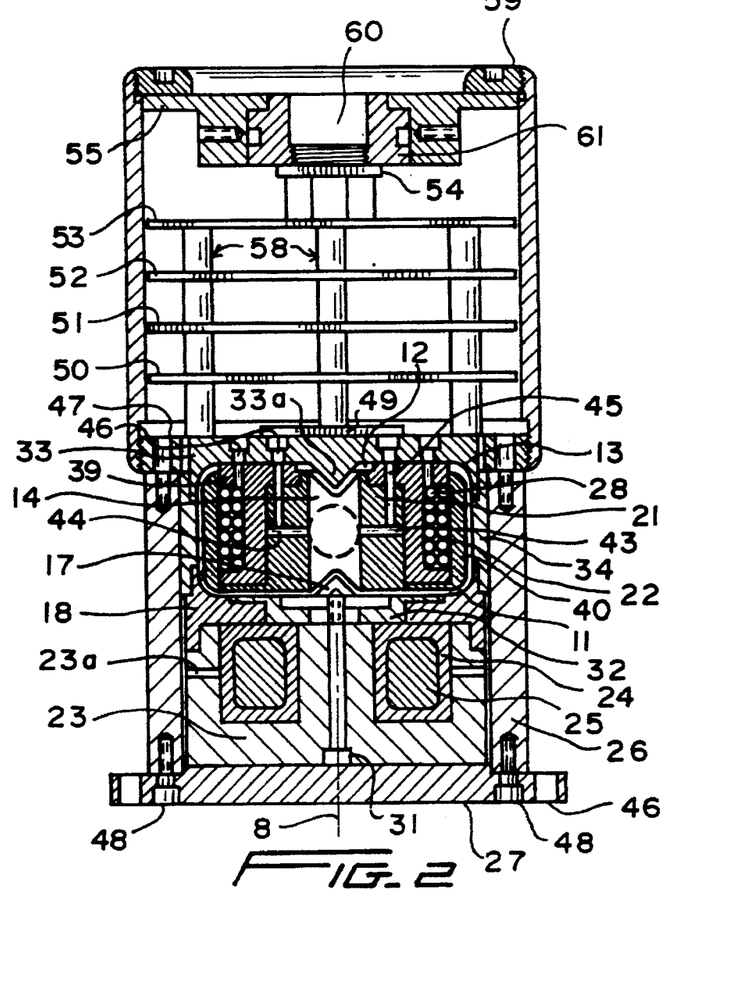
FIG. 2 is a section view taken along lines A—A of FIG. 1 of the sensor assembly in accordance with the preferred embodiment.

FIGS. 1 and 2 are a top view and a cross-section view of a magnetohydrodynamic (MHD) angular rate detector which will measure small rotational velocities in the region of $\frac{1}{1000}°/\text{sec}$, in accordance with the preferred embodiment of the invention.

The sensor includes an lower and upper channel 11, 12 filled with a conductive liquid such as mercury. The channels 11 and 12 lie in parallel planes and are connected together with a central channel 14 along the measurement axis 8 of the sensor 3, and by a return channel 13 at the outer circumference of the channels 12 and 11. A pump 21 located in the central channel 14 provides for a circulation of the conductive liquid proof mass radially into and out of the lower and upper channels 11 and 12. The liquid proof mass contains no voids and constitutes a substantially incompressible liquid. The lower channel 11 is substantially circular and the upper channel 12 includes a plurality of radially extending passageways.

A toroidal magnetic winding 22 is located between the upper and lower channels 11, 12 and induces a magnetic field perpendicular to the lower and upper channels 11, 12.

In accordance with the principles of magnetohydrodynamics, the relative motion between the proof mass within a lower channel 11 with respect to the applied magnetic field produces an electrostatic potential between the inner circumference denoted by the connecting channel 14 and outer circumference denoted by the return channel 13. Electrodes 17 and 18 located in contact with the inner and outer circumference produce an electrostatic potential when the sensor is rotated about its sensitive axis, which is time varying in accordance with the periodic rate of the voltage applied to the magnetic drive coil 22. A primary winding of a transformer 23 is connected across the two electrodes 17 and 18 which are in contact with the inner and outer circumferences of the lower annular channel 11.

The sensitivity at lower frequency angular rates (below 1 Hz) of the MHD sensor is improved because a radial flow is introduced across the lower circular channel 11 which constitutes a sense channel. The radial flow produces a coriolis velocity component in response to angular rotation of the sensor around the sensor axis 8. The voltage between the inner electrode 17 and outer electrode 18 of the lower circular sense channel 11 represents the angular frequency displacement of the lower channel 11 with respect to the liquid proof mass.

Figure 3:
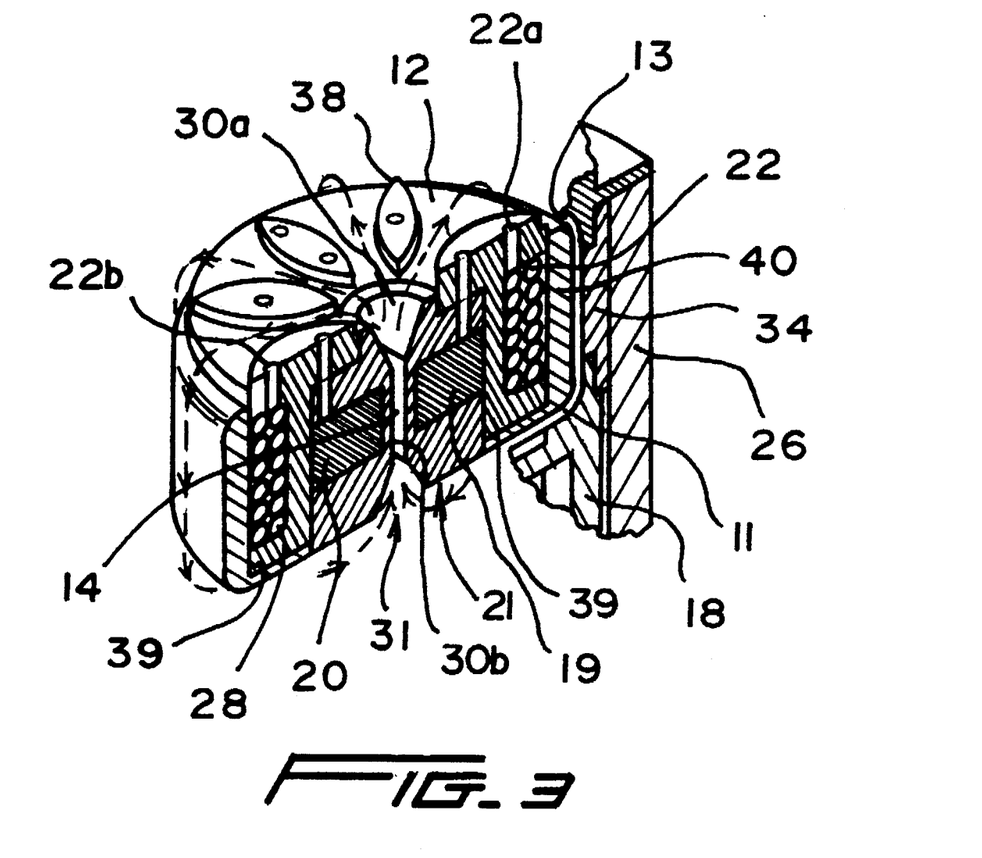
FIG. 3 illustrates the conductive flow path for the pumped proof mass through the fluid circuit comprising central channel 14, lower channel 11, upper channel 12 and return channel 13.

FIG. 3 illustrates the fluid path formed between the lower circular channel 11 and upper channel 12. The pump 21 forces the conductive fluid vertically downwards through central channel 14. The fluid such as mercury is then forced radially outward in the lower channel 11. The fluid then travels from the outer circumference of the lower channel 11 upwards through return channel 13 to the outer circumference of the upper channel 12. The pumped conductive liquid is forced in a plurality of radial paths represented by the arrows of FIG. 3 towards the inner circumference of the upper channel 12. The upper channel 12 is divided into a plurality of radial paths by the oval-shaped blocks 38 on the top of the coil form 39. An upper channel cap 33 forms the exterior wall of the upper channel 12 (see FIG. 2). The radial blocks include a plurality of through holes through which the ends 22a, 22b of the drive coil 22 are fed as a pair through one hole, as well as a through hole for ends 28a, 28b of a drive coil feedback winding 28, wound concentrically with the drive coil windings 22 on coil form 39.

Additionally, there are holes in the upper channel cap 33 through blocks 38 for each of the connecting electrodes 45 and 46 to be passed through and insulated therefrom. The connecting electrodes 45, 46 protrude above the upper lid 33 so that connections can be made to a circuit board 49, and to electrodes 43, 44 of the pump 21.

A pair of ends 28a and 28b of the EM drive coil feedback winding 28 are fed as a pair through holes of the blocks 38. The remaining holes of the blocks 38 receive fasteners to support the pump assembly 21 and upper lid 33 to coil form 39.

The return channel 13 constitutes a gap between the upper channel insulator 40 and the outer return wall 34. The flow into the lower circular channel 11 includes a radial component which is subject to a coriolis acceleration when the sensor rotates about its sense axis 8. The circumferential velocity component produced in the flow path of circular channel 11 produces a radially oriented electrostatic potential across the channel 11.

The circular lower channel 11 has an outer wall which includes the outer electrode 18, a lower sense channel insulator 32 and the inner sense channel electrode 17. Each of these components is circular, fitting within the housing 26 and supported on the primary winding 23. The primary winding 23 encloses the toroidal transformer core 25 and the secondary winding 24.

The inner walls for the circular lower channel 11, return channel 13 and upper channel 12 is formed by the return channel insulator (coil form cover) 40, the pump assembly 21 and the toroidal coil form 39 supporting the drive coil 22. The upper channel cap 33 is fastened with fasteners 47 to the exterior housing 26.

Figure 4:
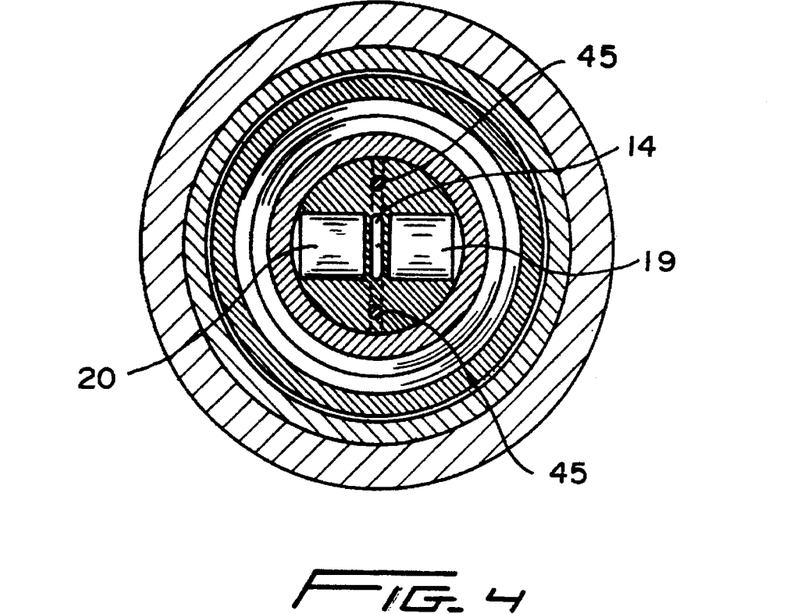
FIG. 4 is a top section view of the pump assembly 21.
Figure 5:
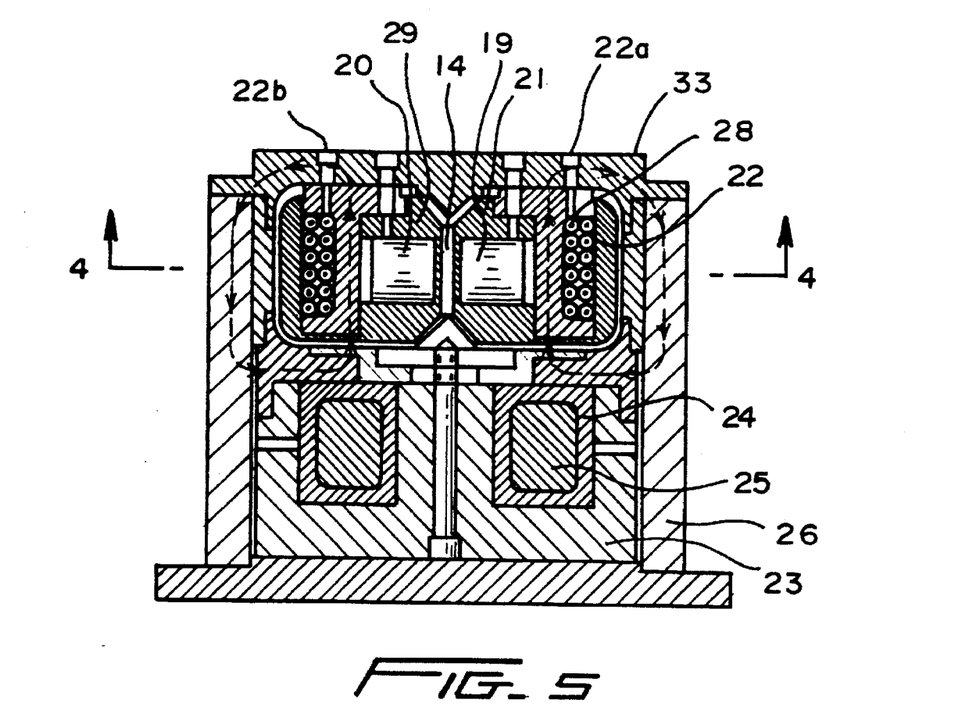
FIG. 5 illustrates the alternating magnetic field path and pump assembly for the sensor in accordance with the preferred embodiment.

The magnetohydrodynamic pump 21 for creating the fluid flow is shown more particularly in the section views of FIGS. 4 and 5. The pump 21 includes a pair of permanent magnets 19 and 20 having a common magnetic orientation, supported in a pump housing 29 perpendicular to the central channel 14 connecting the circular lower channel 11 and the radial upper channel 12. The permanent magnets 19 and 20 face the shorter dimension of the central channel 14. A pair of electrodes 43, 44 (see FIG. 2) are provided along the wider dimension of the central channel 14 and contact exterior contacts 45, 46. The electrodes 43, 44 for applying a voltage across the channel 14 are located along the wider dimension, and constitute conductive threaded inserts which extend into the inside wall of central channel 14 and contact the conductive liquid in central channel 14. Using the MHD principle, the application of a DC voltage to the exterior contacts 45, 46 results in an electrostatic field and corresponding current across the wider dimension of the central channel 14 perpendicular to the applied magnetic field of magnets 19 and 20. The result is a pumping force imparted to the conductive liquid (mercury) in the channels. A flow is established from the upper channel 12 to the lower channel 11 through the central channel 14.

A channel cap 33 includes a tapered center section 33a which is received in the countersunk opening 30a of the central channel 14. The channel cap 33 forms the upper walls for the radial channels 12 carrying the pumped conductive fluid. The channel cap 33 includes holes for the connections to the toroidal drive coil wound about the magnetic coil form 39.

The coil 22 has ends 22a and 22b extending through a block 38 of the upper channel cap 33 to a source of alternating voltage. The increased measurement sensitivity for the device results in part from the alternating magnetic field which generates the alternating MHD voltage potential produced on electrodes 17 and 18 when the sensor is rotated about the sensitive axis. The alternating voltage sensed by the inner electrode 17 and outer electrode 18 is also time varying, and by using synchronous detection techniques, wherein the voltage applied to the coil 22 is used a reference voltage to be compared with the voltage across the leads of the secondary winding 24, the MHD-generated voltage across the sense channel between electrodes 17 and 18 may be detected in the picovolt range due to the amplification via the toroidal transformer core 25.

A second feedback coil 28 is wound about the coil form 39 and includes a pair of winding ends 28a,b. The winding ends extend as a twisted pair through the same hole within the coil form 39, oval shaped blocks 38 and through the lid 33, wherein they are connected to circuit board 49 of FIG. 2. The feedback coil permits the monitoring of the magnetic flux produced by the drive coil 22 so that the flux density amplitude B and frequency may be maintained constant. The control over flux density enhances the sensor resolution and provides ultrastable sensitivity (scale factor) control over time and temperature.

Additionally, through the use of a step-up transformer comprised of the toroidal core 25, secondary winding 24, and primary winding 23, it is possible to significantly increase the rate sensitivity or resolution from the device. The inner and outer electrodes 17 and 18 are connected to the primary winding 23 of the transformer. The primary winding 23 of the transformer is a single turn comprising a copper cup having a toroidal channel filled with a toroidal transformer core 25 and having a multi-turn secondary winding 24 wound on the transformer core. The primary winding is connected at two points to electrodes 17 and 18. Electrode 17 includes in the base thereof a threaded hole for receiving bolt 31. The single electrode 17 and an insulator 32 are fastened to the copper cup comprising primary winding 23.

The outer electrode 18 is spaced by the sense channel insulator 32 from the inner electrode 17. The outer electrode 18 contacts the copper cup comprising primary winding 23 along the periphery thereof.

The ends 24a, b of secondary winding 24 are brought through a hole 23a as a twisted pair. The twisted pair extends upwardly adjacent the housing 26 and between the housing 26 and return channel outer wall 34, through an opening in the upper lid 33. The ends of the transformer secondary winding are received in the electronics board 49 on the sensor. The secondary winding 24 wound on the transformer core 25 and primary winding 23 will provide a current amplified signal which may be used in a synchronous detection technique with the voltage applied to driving coil 22 to measure angular velocity about the axis 8.

The relationship of the alternating magnetic field to the sense channel 11 is illustrated in FIG. 5. The arrows show the direction the flux generated from a toroidal wound coil 22 supported by a magnetic core 39 is perpendicular to the circular lower channel 11.

Figure 6:
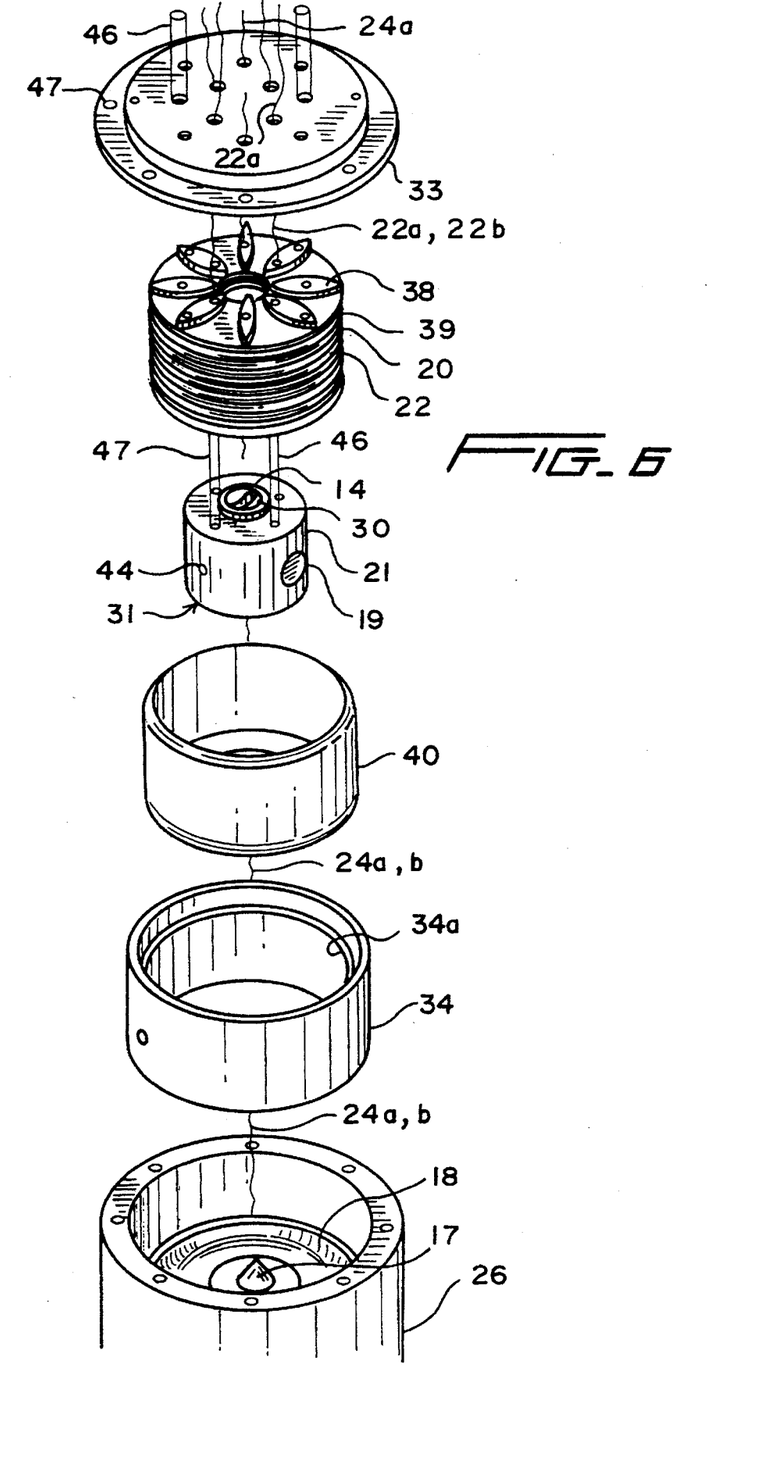
FIG. 6 is an exploded view of the sensor of the preferred embodiment.

A detailed exploded view of the sensor in accordance with a preferred embodiment is shown in FIG. 6. The sensor is housed in a housing 26 connected to a base plate 27 by appropriate fastener 48. An inner sense channel electrode 17 is supported by the insulator 32. An outer electrode 18 forms a portion of the exterior wall of the circular channel 11. The drive coil 22 is surrounded by the upper channel insulator (coil form cover) 40. The upper channel insulator 40 slides within the return channel insulator 34. The return channel insulator 34 maintains an insulating air gap between the outer electrode 18 and the housing 26. The space between the upper channel insulator 40 and return wall 34 provides the return channel for the fluid exiting the upper channel 12 formed between the magnetic core 39 and upper channel lid 33. The upper channel lid 33 includes a circular ridge (shown more clearly in FIG. 2) which sits on the ridge 34a within the return wall 34.

The pump 21 is located within the magnetic core 39. The magnetic pump 21 includes the central channel 14 open at the top and bottom thereof through countersunk openings 30a and 30b. The countersunk openings 30a and 30b receive, respectively, a tapered portion 33a of the upper channel cap 33, and the tapered inner sense electrode 17. Both the tapered inner sense electrode 17 and upper channel cap taper 33a form a wall of the fluid path entering and exiting the central channel 14.

The upper channel cap 33 is fastened to the exterior case 26 through a series of threaded screws which pass through the clearance holes 47 into the threaded housing wall 26.

FIG. 2 also illustrates a completed sensor unit which includes a series of stacked printed circuit boards. The first of these printed circuit boards 49 connects the drive coil leads 22a, 22b, the secondary sense windings 24a, 24b, the pump electrodes 45, 46 and the drive feedback winding leads 28a, 28b. Printed circuit board 50 contains the demodulation circuitry necessary for synchronously demodulating the detected angular rate signal. Drive board 51 provides the alternating voltage for the electromagnetic drive coil 22. A power supply board 53 is shown which provides the power supply voltages for running electronics on the demodulator board 50 and drive board 51. A connector board 54 is supported on an upper electronics lid 55. 52 is the MHD pump board which controls the radial flow rate.

The cylindrical supports 58 containing the boards includes first and second threaded ends which are threaded to the upper channel cap 33. A tightening ring 59 holds a connector 60 and its header 61 in place. A base plate 27 connected to the housing wall 26 includes a flange having a plurality of clearance holes 64 for fastening the sensor and electronic assembly to the measurement surface.

Figure 7:
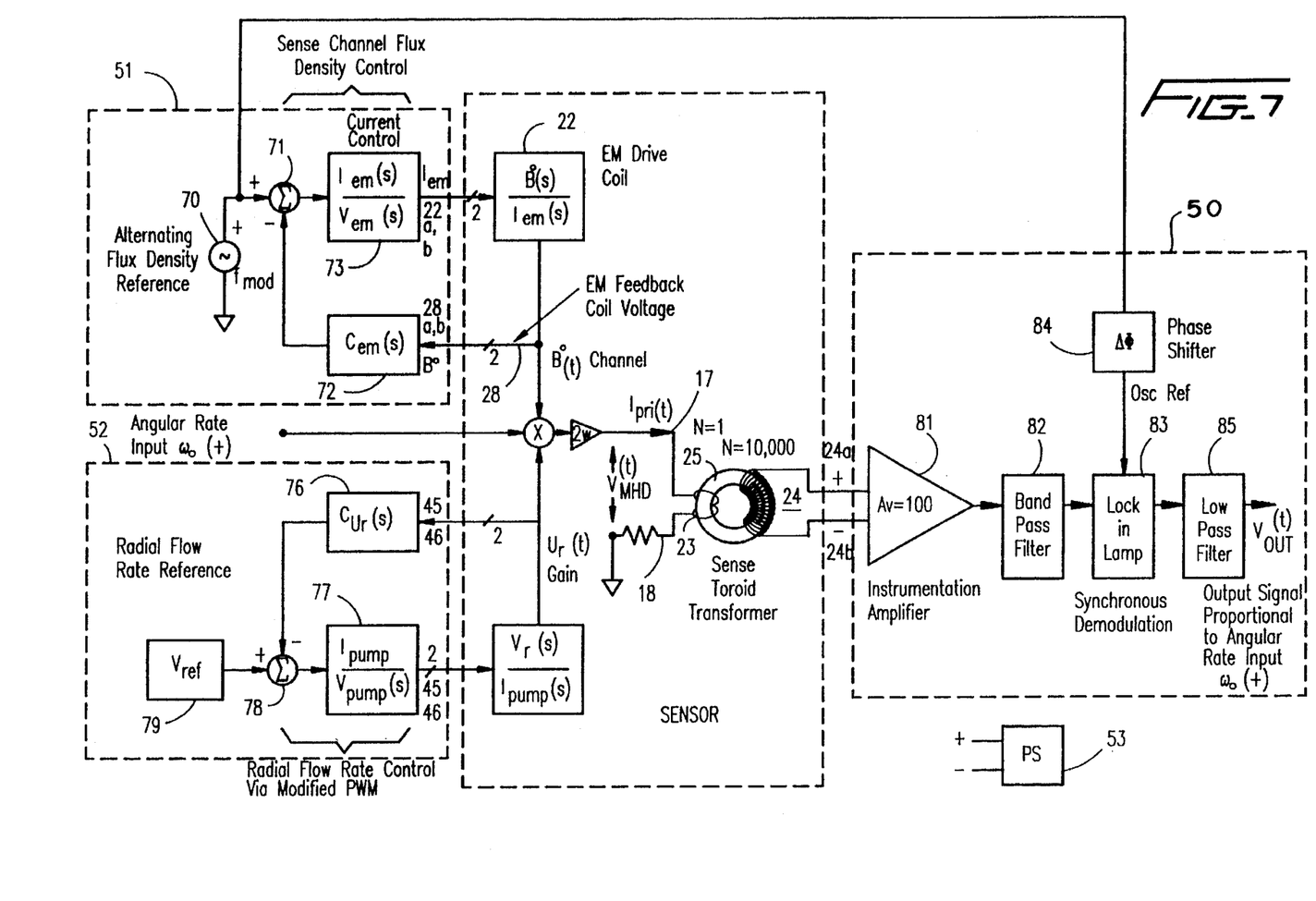
FIG. 7 is a block diagram illustrating the measurement circuit derived from the sensor of the preferred embodiment and its related electronic circuitry.

FIG. 7 is a block diagram which illustrates the necessary electronic circuitry for operating the sensor. The drive board 51 includes an alternating signal source 70 for creating the alternating flux within the sensor. The alternating signal source 70 such as a precision oscillator, supplies a controlled current to the drive coil 22 of the sensor. The feedback winding 28 is connected to a feedback circuit 72 for deriving an error signal to maintain the flux density within the sensor constant. The summing junction 71 provides the error signal to a current driver 73 to maintain a constant flux density.

The MHD pump board 52 includes a voltage reference for setting a radial flow rate in the sense channel 11. The flow rate control is derived from sensing the flow rate produced by the MHD pump, and supplying a feedback signal through feedback circuit 76 to a summing junction 78. A pulse width modulated power circuit 77 provides pulse width modulated pulses to the MHD pump electrodes 45, 46 in accordance with the error signal to provide a regulated flow rate within the sensor producing a pumping force on the liquid in central channel 14.

As the sensed output signal from inner and outer sense electrodes 17 and 18 is proportional to the electromagnetic flux B created by winding 22, the radial flow rate $U_r$ and the angular input rate $\omega_o(t)$ representing by the summing function, by maintaining the flux constant as well as the radial flow within the sensed channel constant, an output signal results which is an accurate measurement of the input angular rate $\omega_o(t)$.

The sensed voltage on inner and outer sense electrodes 17 and 18 is amplified by the toroid transformer comprising primary winding 23 and secondary winding 24.

The sensor signal processing electronics containing the demodulation circuit necessary for synchronously demodulating the detected angular rate signal is contained on the sensor electronics board 50. The sensor signal processing electronics includes an instrumentation amplifier 81 which amplifies the signal from winding 24. A bandpass filter 82 filters the signal which is synchronously detected by the synchronous demodulator 83.

A reference signal for the synchronous demodulator 83 is derived from the signal source 70. Phase shifter 84 establishes the correct phase for the synchronous demodulator reference signal.

The demodulated output signal is further filtered in a low pass filter 85 to provide a signal proportional to the input angular rate $\omega_o(t)$.

The flux density control from the drive electronics circuit board 51 produces a flux density which oscillates at a rate which is at least in order of magnitude higher than the rate measurement bandwidth. The sensor provides for at least a 100 Hz measurement bandwidth which is obtainable with a flux density oscillation frequency of at least 1000 Hz.

The radial flow control rate in the sense channel is directly proportional to the flow rate through the MHD pump within the sensor. The radial flow rate is maintained constant with respect to a preset reference level determined by reference 79. Changes in temperature and voltage reference drift are significantly reduced by the MHD pump control circuit 52.

A power supply circuit 53 is shown for supplying the circuit elements of FIG. 7 with the required operating potential. All external connections to the device are made through connector 60.

The demodulated output voltage is proportional to an angular input about the sensitive (cylindrical) axis of the sensor over a measurement bandwidth of dc-100 Hz. The frequency response function (FRF) is adjustable and is dependent on multiple parameters associated with both the sensor and the signal conditioning electronics of FIG. 7. Analogous to the FRF as described in U.S. Pat. No. 5,176,030, the angular rate sensitivity of the sensor is a composite of two rate sensing mechanisms which are superimposed in the output signal. Equation 1 is the frequency response function for the sensor including the signal processing electronic contribution.

$$H(s) = \frac{B_{ac} w (r_{rms} s + 2 U_r)}{s + \frac{v}{h^2}(1+M^2)} \cdot \frac{N_2}{N_1} \cdot \frac{2}{\pi} \cdot A_v \cdot H_{LPF}(s) \quad (1)$$

where $B_{ac}$=the peak alternating flux density applied normally through the sense channel 11 (T)

w=the effective width of the sense channel 11 (m)

h=the effective thickness of the sense channel 11 (m)

$U_r$=sense channel 11 mean radial flow rate (m/s$^2$)

$r_{rms}$=the sense channel 11 rms radius (m)

M=Hartmann number (unitless parameter)

$N_1$=number of turns for the primary winding 23 (effectively 1 in the preferred embodiment)

$N_2$=number of turns for the secondary winding 24

$A_v$=signal conditioning electronics amplifier 81 gain $H_{LPF}(s)$=signal conditioning electronics low pass filter 85 response s=j$\omega$=j$2\pi$f=complex frequency variable The effective sense channel 11 width w is the difference between the outer radius of the sense channel 11, which is in contact with the outer sense electrode 18 and the inner radius of the sense channel 11 which is in contact with the inner sense electrode 17. The Hartmann number M is a unitless magnetohydrodynamic parameter defined as the ratio of the magnetic body force to the viscous force and is expressed here as $$M = \frac{\bar{B} h}{\sqrt{\sigma v \eta}} \quad (2)$$

where,

B=average magnetic flux density (constant and alternating) applied through sense channel 11 v=the kinematic viscosity of the conductive fluid (vhg= 1.15e-7 m$^2$/s) proof mass $\eta$=the electrical resistivity of the conductive fluid ($\eta$hg= 9.58e-7$\Omega$m) proof mass $\sigma$=the density of the conductive fluid ($\sigma$hg=1.354e+4 kg/m$^3$) proof mass h=sense channel 11 effective height (m)

The $N_2/N_1$ term in the frequency response is the sense channel 11 voltage amplification via the integral toroidal/ transformer. The $N_2/N_1$ ratio assumes that the flux density modulation frequency is much higher (greater than 10 times for example) than the low corner frequency of the step up transformer such that the voltage amplification can be closely approximated as the ratio of the number of turns on the secondary winding 24 to the number of turns on the primary winding 23, or $N_2/N_1$. The toroidal transformer in the present embodiment has a low corner frequency $f_c$ which is typically less than 10 Hz whereas the flux density modulation frequency $f_{mod}$ will usually be greater than 100 Hz. The frequency responses of an ideal electromagnetic step up transformer can be represented as:

$$H_{TRAN}(s) = \frac{V_2(s)}{V_1(s)} = \frac{SL_{12}}{SL_1 + R_1} \quad (3)$$

where, $V_1$=primary winding 23 voltage (V)

$V_2$=secondary winding 24 output voltage (V)

$R_1$=primary winding 23 resistance ($\Omega$)

$L_1=N_1^2/Rm$=the primary winding 23 inductance (H)

$L_{12}=N_1 N_2/Rm$=the secondary winding 24 inductance (H)

Rm=magnetic reluctance (A/Wb) of the torroidal core 25 and the low corner frequency $f_c$ is determined by, $$f_c = R_1/(2\pi L_1) \quad (4)$$

If $f_{mod} \gg f_c$, then the denominator of the transformer response is dominated by the $sL_1$ term and the $R_1$ contribution is negligible and the denominator in (3) can be approximated by $SL_1$. Therefore, if the sinusoidal flux density [$B_{ac}$ sin ($2\pi f_{mod} t$)] is oscillating at a much higher frequency ($f_{mod}$) than the transformer cutoff frequency ($f_c$) then the frequency response function is closely approximated as $SL_{12}/SL_1$, which reduces to $N_2/N_1$, and the phase response at the modulation frequency is near zero degrees.

The 2/$\pi$ term in the FRF is the ratio of the peak amplitude to the average amplitude for a full-wave rectified sinusoidal signal. The synchronous demodulation circuit 50 performs a sign dependent full-wave rectification of the secondary winding 24 output signal.

The upper cutoff frequency for the frequency response function is set by the low pass filter (LPF) 85. The cutoff frequency is usually set to ⅕th to ⅒th of the alternating magnetic field modulation frequency $f_{mod}$ such that the modulation ripple is adequately removed. For preferred embodiment the FRF plot is set to 100 Hz, assuming a modulation frequency of 500 Hz or more. The second order LPF 85 has a cutoff frequency of $f_{LPF}$ and a damping coefficient $\xi$ and is represented as, $$H_{LPF}(s) = \frac{(2\pi f_{LPF})^2}{s^2 + 2\pi \xi f_{LPF} s + (2\pi f_{LPF})^2} \quad (5)$$

where, $f_{LPF}$=the low pass filter −3 dB cutoff frequency
$\xi$=damping coefficient, and
s=complex frequency variable.

The frequency response which dominates the high frequency response (above 1 Hz, analogous to the passive (non-dc) mode sensing in U.S. Pat. Nos. 4,718,276 and 5,067,351 is proportional to the rms radius of the sense channel ($r_{rms}$), whereas the low frequency (dc to about 1 Hz) response is based on the mean radial flow rate ($U_r$) flowing outward in the sense channel 11.

For a flat response of the sensor transfer function from dc-100 Hz, the low frequency and the high frequency gains must be equivalent. This condition is true if the radial flow rate is equal to the following, $$U_r = U_{ro} = \frac{r_{rms} v (1 + M^2)}{2h^2} \quad (6)$$

Figure 8:
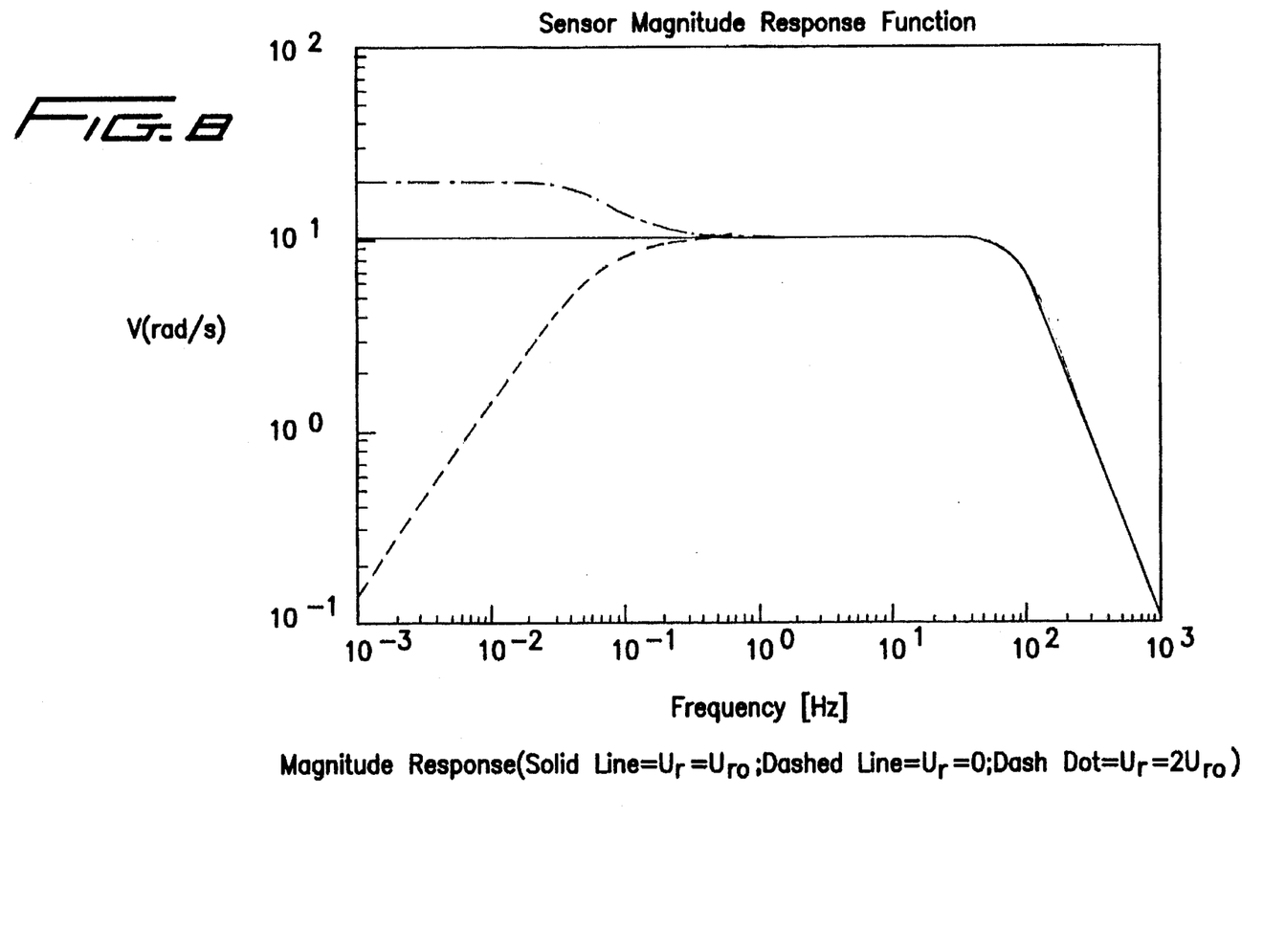
FIG. 8 illustrates the magnitude response of the sensor with respect to the frequency of angular velocity or rate.
Figure 9:
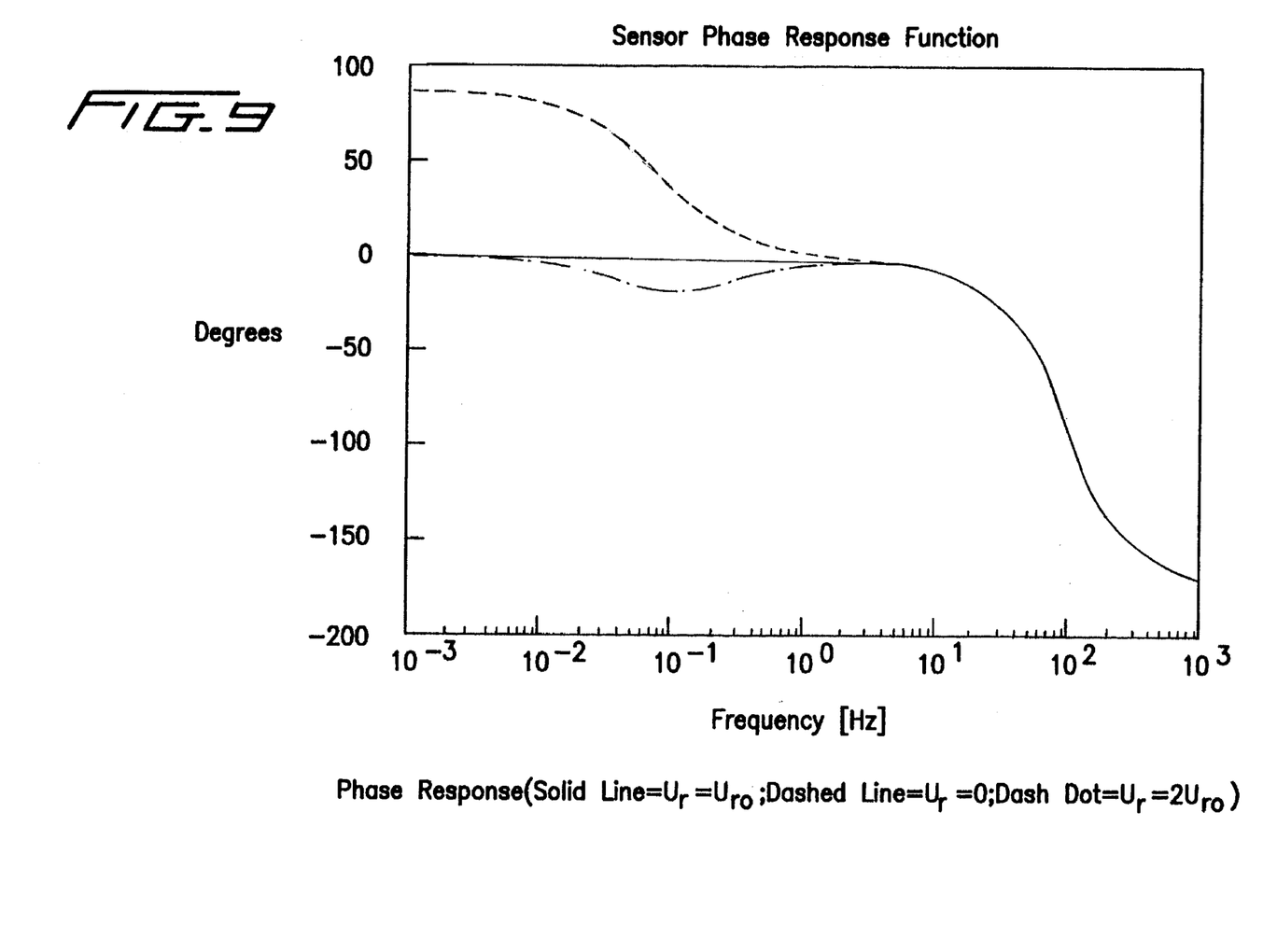
FIG. 9 illustrates the phase response of the sensor with respect to the frequency of angular velocity or rate.

FIG. 8 is the Bode magnitude plots and FIG. 9 is the phase plots for the sensor FRF for the Ur=0, the $U_r = U_{ro}$ (flat response) as calculated by Eqn. 6, and for the $U_r = 2U_{ro}$ condition. The $U_r = 0$ condition is analogous to the passive mode frequency response where the dc (zero frequency) gain is identically zero. For the frequency response shown in FIGS. 8 and 9 the following parameters were used in the calculation:

$B_{ac}$=0.005 T
W=0.01 m
h=0.0005 m
$r_{rms}$=0.016 m
$U_r = U_{ro}$=0.0037 m/s (solid line in FIG. 8 and 9)
$U_r$=0 =m/s (dashed line in FIGS. 8 and 9)
$U_r = 2U_{ro}$=0.0074 m/s (dash-dot line in FIGS. 8 and 9)
M =0.065 (unitless)
$N_1$=1 turn
$N_2$=10,000 turns
$f_{LPF}$=100 Hz
$A_v$=2000 V/V These parameters are representative of the sensor in a the desirable embodiment using mercury as the conductive fluid. The dc scale factor of this example is 10 V/(rad/s).

Thus there is described an apparatus which measures angular velocity with improved resolution. Those skilled in the art will recognize yet other embodiments described more particularly by the claims which follow.

What is claimed is:

1. A magnetohydrodynamic rate sensor comprising:

first and second conductive annular fluid channels disposed along a common rotational axis, and connected together by a pumping means which forms a radial flow of a conductive liquid proof mass within said annular channels;

a magnetic field generating means for creating an alternating electromagnetic field perpendicular to said first and second channels, whereby an electric field is established across said first and second channels; and a sense winding disposed around a toroidal transformer core in parallel with said first and second conductive annular fluid channels for sensing said electric field which varies in magnitude with said alternating electromagnetic field and a rotational velocity of said first and second annular channels with respect to said conductive liquid proof mass.

2. The magnetohydrodynamic rate sensor of claim 1 wherein said magnetic field generating means comprises a toroidal coil for receiving an alternating current disposed between said first and second conductive annular fluid channels, having an axis in common with said common rotational axis.

3. The magnetohydrodynamic rate sensor of claim 1 wherein said sense winding is a primary winding of a transformer which provides on a secondary winding of said transformer an amplified voltage in response to a current induced in said primary winding.

4. The magnetohydrodynamic rate sensor of claim 1 wherein said pumping means comprises:

a return channel connecting the outer circumference of said annular channels, and a central channel connecting the inner circumference of said annular channels; and a pump in one of said channels connecting said annular channels.

5. The magnetohydrodynamic rate sensor of claim 4 wherein said pump comprises a magnetohydrodynamic pump.

6. The magnetohydrodynamic rate sensor of claim 5 wherein said magnetohydrodynamic pump comprises:

a permanent magnet means for producing a static magnetic field perpendicular to said central channel, and first and second electrodes positioned along said central channel for establishing an electrical field perpendicular to said static magnetic field and causing current to flow across the central channel to force said conductive fluid through said central channel to produce a radial flow in said annular channels.

7. A magnetohydrodynamic rate sensor comprising:

a housing having a circumferential outer wall closed at one end by a baseplate;

a transformer including first and second concentrically wound windings located in said housing;

a first annular channel disposed above said transformer, said annular channel including along the outer circumference thereof a first electrode, and along an inner circumference thereof a second electrode connected to said transformer first winding;

a second annular channel disposed above said first annular channel, and connected along an inner circumference to an inner circumference of said first annular channel via a central channel located along an axis of said annular channels, and connected along the outer circumference to the outer circumference of said first channel whereby a continuous fluid path is formed between said channels;

a pump means for forcing a conductive liquid proof mass through said continuous fluid path;

a magnetic field generating means for introducing a time varying magnetic field perpendicular to said annular channels, wherein an electric field is produced across said first and second electrodes, and is amplified by said transformer; and an upper channel cap forming an enclosure of said housing.

8. The magnetohydrodynamic sensor of claim 7 wherein said pump means comprises a permanent magnet means adjacent said central channel, and first and second pumping electrodes for providing an electric field perpendicular to said central channel in response to an applied voltage for creating a pumping force on a conductive liquid mass in said central channel.

9. The magnetohydrodynamic sensor of claim 8 wherein said magnetic field generating means comprises a toroidal winding for receiving an alternating current supported on a magnetic coil form which encloses said pumping means.

10. A magnetohydrodynamic sensor for measuring angular velocity comprising:

an annular channel having a conductive liquid proof mass supported therein, said channel receiving a radial flow of conductive liquid between the center of the annular channel and the circumference of the annular channel;

an electromagnetic winding for producing an alternating electromagnetic field directed perpendicularly to said annular channel;

first and second electrodes connected to sense a time varying electrical potential induced between the center of the annular channel and the circumference of the annular channel, said time varying electrical potential having an amplitude proportional to the strength of said time varying electric field and the rotational velocity of said channel with respect to said proof mass; and a transformer connected to receive said electrical potential across said electrodes, and to provide an amplified signal representing said electrical potential.

11. The magnetohydrodynamic sensor of claim 10 further comprising:

a second annular channel in parallel with said first annular channel, said first and second annular channels being connected together at a center thereof by a conduit along an axis common to both channels, and said first and second annular channels being connected to each other along the circumference; and a pump connected to create a flow of conductive liquid between said first and second annular channels.

12. The magnetohydrodynamic sensor of claim 11 wherein said pump comprises a permanent magnet means along said conduit, and a pair of electrodes along said conduit for creating an electric field and associated current perpendicular to said magnetic field for creating a force for pumping said conductive liquid between said annular channels.

13. The magnetohydrodynamic sensor of claim 10 further comprising:

a precision oscillator connected to said electromagnetic winding for producing said alternating electromagnetic field; and a synchronous demodulator connected to said precision oscillator and to a secondary of said transformer for producing a voltage proportional to the rotational velocity of said channel with respect to said liquid proof mass.

14. The magnetohydrodynamic sensor of claim 10, wherein said electromagnetic winding is a toroidal winding having an axis common to an axis of said annular channel, supported on a magnetic core.

* * * * *